United States Patent [19]
Yamashita et al.

[11] Patent Number: 5,881,381
[45] Date of Patent: Mar. 9, 1999

[54] METHOD AND SYSTEM FOR MAPPING NON-UNIFORM TABLE-STRUCTURE INPUT DATA TO A UNIFORM CELLULAR DATA STRUCTURE

[75] Inventors: Akio Yamashita, Tokyo; Yuki Hirayama, Kawasaki, both of Japan

[73] Assignee: International Business Machines Corporation, Armonk, N.Y.

[21] Appl. No.: 529,296

[22] Filed: Sep. 15, 1995

[30] Foreign Application Priority Data

Sep. 16, 1994 [JP] Japan .................................. 6-221543

[51] Int. Cl.⁶ ...................................................... G06F 7/00
[52] U.S. Cl. ........................... 707/509; 707/503; 707/507
[58] Field of Search .................... 395/764, 765, 395/766, 767, 768, 770, 771, 774, 777, 778, 339, 335; 382/176, 177; 707/503, 504, 505, 506, 507, 509, 510, 513, 515, 516; 345/339, 335

[56] References Cited

U.S. PATENT DOCUMENTS

| | | | |
|---|---|---|---|
| 4,435,778 | 3/1984 | Cason et al. ............................. | 395/770 |
| 5,048,107 | 9/1991 | Tachikawa ............................... | 382/173 |
| 5,175,810 | 12/1992 | Young et al. ............................ | 395/770 |
| 5,228,100 | 7/1993 | Takeda et al. ........................... | 382/175 |
| 5,293,429 | 3/1994 | Pizano et al. ........................... | 382/202 |
| 5,438,657 | 8/1995 | Nakatani ................................. | 395/767 |
| 5,465,304 | 11/1995 | Cullen et al. ........................... | 382/176 |
| 5,485,566 | 1/1996 | Rahgozar ................................ | 395/770 |
| 5,555,362 | 9/1996 | Yamashita et al. ..................... | 395/779 |
| 5,613,131 | 3/1997 | Moss et al. ............................. | 395/765 |
| 5,615,367 | 3/1997 | Bennett et al. ......................... | 395/613 |

OTHER PUBLICATIONS

*Microsoft Office 6–in–1*, New Edition, QUE Corporation, 1994, pp. xxix, 208–209, 637–639, 713–717 and screen printouts 1–11.

Ferranti et al, "Suites turn software tide", *PC Week*, Oct. 1993, v10, n 41, p. 1.

*Primary Examiner*—Stephen S. Hong
*Attorney, Agent, or Firm*—Norman L. Gundel

[57] ABSTRACT

A technique to make it possible to paste text display data in a text-editing program, which is arranged in table format and not formed into a geometrical format, onto a table region of a spreadsheet program as normal cell data by providing a table-format converter for processing data that is sent to a clipboard or transferred to a spreadsheet program by DDE. The table-data converter converts data to a format reflecting a table structure such as a CSV format by detecting the rule-lined data or spaces between columns of a table of the text-editing program.

3 Claims, 9 Drawing Sheets

| | コンピュータ部門系A | | | | 一 般 社 | |
|---|---|---|---|---|---|---|
| 回答年度 | 委員数買記入数 | 1社白たり平均額(千円) | 委員変委員数校記入数 | 1人当たり平均額(千円) | 社最教買買記入数 | 1社当たり平均額(千円) |
| 1992 | 547 | 3,333.50 | 541 | 76.3 | 266 | 7,775.20 |
| 1991 | 565 | 3,626.40 | 553 | 76.5 | 263 | 5,883.20 |
| 1990 | 439 | 2,389.70 | 434 | 60.2 | 224 | 6,218.40 |
| 1989 | 503 | 2,616.30 | 493 | 58.1 | 249 | 5,314.70 |
| 1988 | 450 | 1,942.20 | 445 | 47 | 239 | 5,029.10 |

|   | a | b | c | d |
|---|---|---|---|---|
| 1 | A | B |   | C |
| 2 | D |   | E |   |
| 3 | F |   |   | G |
| 4 | H | I | J |   |
| 5 |   | K |   | l |

FIG. 12

|  | Change in height | | Change in weight | |
|---|---|---|---|---|
| Tanaka | 170.5 | 172.5 | 65.5 | 66.0 |
| Yamada |  | 170.2 | 63.5 | 64.0 |
| Shimizu | 172.3 | 173.5 | 67.5 | 67.0 |
| Mean | 171.4 | 172.1 | 65.4 | 65.7 |

|  | Change in height | | Change in weight | |
|---|---|---|---|---|
| Tanaka | —170.5— | 172.5 — | 65.5 — | 66.0— |
| Yamada |  | 170.2 ↔ | 63.5 ↔ | 64.0↔ |
| Shimizu | ↔171.3↔ | 173.5 ↔ | 67.5 ↔ | 67.0— |
| Mean | ↔171.4 — | 172.1 | 65.4 — | 65.7— |

FIG. 15

|  | Change in height | | Change in weight | |
|---|---|---|---|---|
| Tanaka | 170.5 | 172.5 | 65.5 | 66.0 |
| Yamada |  | 170.2 | 63.5 | 64.0 |
| Shimizu | 172.3 | 173.5 | 67.5 | 67.0 |
| Mean | 171.4 | 172.1 | 65.4 | 65.7 |

FIG. 16

|  | Change in height | | Change in weight | |
|---|---|---|---|---|
| Tanaka | 170.5 | 172.5 | 65.5 | 66.0 |
| Yamada |  | 170.2 | 63.5 | 64.0 |
| Shimizu | 172.3 | 173.5 | 67.5 | 67.0 |
| Mean | 171.4 | 172.1 | 65.4 | 65.7 |

FIG. 17

|  | Change in height | | Change in weight | |
|---|---|---|---|---|
| Tanaka | 170.5 | 172.5 | 65.5 | 66.0 |
| Yamada |  | 170.2 | 63.5 | 64.0 |
| Shimizu | 172.3 | 173.5 | 67.5 | 67.0 |
| Mean | 171.4 | 172.1 | 65.4 | 65.7 |

FIG. 18

|  | Change in height | | Change in weight | |
|---|---|---|---|---|
| Tanaka | 170.5 | 172.5 | 65.5 | 66.0 |
| Yamada |  | 170.2 | 63.5 | 64.0 |
| Shimizu | 172.3 | 173.5 | 57.5 | 67.0 |
| Mean | 171.4 | 172.1 | 65.4 | 65.7 |

FIG. 19

|  | Change in height | | Change in weight | |
|---|---|---|---|---|
| Tanaka | 170.5 | 172.5 | 65.5 | 66.0 |
| Yamada |  | 170.2 | 63.5 | 64.0 |
| Shimizu | 172.3 | 173.5 | 67.5 | 67.0 |
| Mean | 171.4 | 172.1 | 65.4 | 65.7 |

FIG. 20

METHOD AND SYSTEM FOR MAPPING NON-UNIFORM TABLE-STRUCTURE INPUT DATA TO A UNIFORM CELLULAR DATA STRUCTURE

FIELD OF THE INVENTION

The present invention relates to a technique which cuts and pastes a document or data between application programs such as a wordprocessor program and a spreadsheet program, which are operating in the multi-window environment of a computer.

PRIOR ART

In the initial stages of the advent of the personal computer, the only task that the operating system could deal with was a simple task because of the low performance of the CPU and the limited capacity of main storage. The personal computer could therefore execute only one from among a wordprocessor, a text editor, and a spreadsheet program at one time.

Nevertheless, in some cases there arose the necessity that a document generated once by the wordprocessor be used in a spreadsheet program, or a table generated in a spreadsheet be utilized by a wordprocessor. This was eventually accomplished, but by a troublesome method. That is, a document or a region of a table for which a range is specified is given a file name as text-format data and written to a disk by accessing a wordprocessor or a special function of a program of the wordprocessor. After that program has ended, another program is operated, and the file name of the text file stored in the disk is specified. The data of the document or table is then transferred to the operated program.

Relatively recently, however, as the performance of the CPU has been enhanced and the address space of the CPU has increased, inexpensive semiconductor memory and large-capacity hard disks have become available. Because of this, an operating system for supporting a multi-task and multi-window system, such as OS/2 (a trademark of IBM) and Windows (a trademark of Microsoft) that can be run on a personal computer has been developed and is being widely used.

Under these operating systems, for example, not only is it possible to use a wordprocessor in one window and to use a spreadsheet program in another window at the same time, but it is also possible to cut and paste data from one application program to another application program.

This is concretely performed as follows: That is, first, the window of one application program is made active, and a rectangular region range is specified using a pointing device such as a mouse. Next, an editing menu is pulled down from the menu bar, and "Copy" or "Cut" is selected. The data (text or bit map) of the specified region is then stored in the clipboard.

Next, the window of another application program is made active, the cursor is moved to the desired position, and "Paste" is selected by pulling down the editing menu from the menu bar. The data of the text or bit map stored in the clipboard is then pasted at the location of the cursor.

Such interfacing is advantageous in that, in spite of the data format inherent to an application program, the text data or bit map data as viewed on the screen can be pasted through the clipboard to the window of another application program. For example, it is possible to paste a portion of an image from an image editor in the process of editing an image file have a TIFF format onto a predetermined position of a wordprocessor window by using an image pasting function. In pasting, it does not matter whether the wordprocessor to which data are pasted supports the TIFF image format.

Incidentally, the requirement often arises for the utilizing of a table described in a printed document for an application program such as a wordprocessor, but the chance that such a document is stored in electronic format is fairly rare and, in the case of the document being a general-purpose magazine, there is no such possibility.

PUPA 4-278634 discloses a technique that converts a printed document to an image file once by a scanner and performs the recognition of document so that information on the layout is reflected. In accordance with such a technique, an electronic file can be obtained from a printed document, with the table and set of rows of the original document being retained.

PUPA 2-58970 further discloses that an image from a host computer and an image read through a scanner can be arbitrarily moved, cut, and merged to output an image.

Further, PUPA 2-301860 discloses a document input means, an image input means, and an image memory. The image memory comprises a masking means in which input image data is stored and which masks the storage of the image data in the image memory, a specification means for specifying a document spread position in the image memory, and a spread means for spreading each character corresponding to the document data to the document spread position in the image memory in question.

It is possible in accordance with such prior art, on the one hand, to combine an image on a viewer obtained from a printed document and character data together by a technique such as a cut-and-paste method and to make an electronic document in the desired layout.

Spreadsheet programs are used frequently, on the other hand, in the field of financial management and business management and serve as a main means of operation in many enterprises. Because the data which is cut and pasted by the above-described prior art is image data, however, the data cannot be pasted as a form of regular cell data into the spreadsheet program. It is, at the most, possible to paste the data as a decoration of a pie chart that is displayed by the spreadsheet program. Even if an image in the format of a table has been made with considerable trouble, therefore, inefficient processing involving having a character manually input while viewing a table must be performed in order to input data to the spreadsheet program.

This is not, however, the only particular difficulty caused by the reason that data to be cut and pasted is in the form of a bit map image. If a place written in tabular format is cut and pasted by a normal wordprocessor, for example, text data will normally be stored in the clipboard. If, however, that place is pasted into a spreadsheet program, the entire single column of the original document is made to be stored in a single cell and, therefore, even if there were a place where figures are arranged lengthwise, it would not be impossible to calculate a mean value or to make a bar graph, for example, based on this column of figures alone.

An object of this invention is to provide a method and a system which enable the pasting of table data read from an OCR to the table region of a spreadsheet program as ordinary cell data.

Another object of this invention is to provide a method and a system which enable the pasting of text display data, which are arranged in table format, and not formed into a geometrical format, onto the table region of a spreadsheet program as normal cell data.

SUMMARY OF THE INVENTION

The above objects are attained according to the present invention by providing, at the side of an application program which enables cut-and-past operations, a mechanism for processing data that is sent to a clipboard or transferred directly to the target program by dynamic data exchange (DDE).

More particularly, when an application program in which cut-and-past operations are to be performed is a viewer of the result of recognition by an OCR, the application program is constructed so that the recognition result can be held with tagged text. The tag used herein is intended to mean, for example, the size, the height, and the coordinates of a starting point of the table in a recognized table layout which are expressed by a special symbol starting, for example, at "\." Therefore, when the range to be cut and pasted is specified by the dragging operation of a mouse, it can be calculated which portion of the tagged text has been specified by making reference to the coordinate data of the tagged text being held. Then, after the specified portion of the tagged text has been stored in the buffer region of the application program, the content of the buffer region is not transferred to the clipboard immediately, but a function for processing table data into, for example, a CSV format is accessed. With this, the data is converted to a text data format in which the end of the row is a new line symbol and the end of the column is a comma (or tag). By performing, with such a format, a pasting operation from the clipboard to a typical spreadsheet program such as Excel (a trademark of Microsoft) and Lotus 1-2-3 (a trademark of Lotus Development) for Windows, it becomes possible for the desired data to be stored in each cell of the table, while the table format is maintained as is.

If the cut-and-paste operation is performed according to the prior art when an application program for which cut-and-paste operation is an application program for processing ordinary text, such as a wordprocessor or text editor, the text specified, for example, by a mouse, will be transferred to the clipboard, without being converted. According to the present invention, however, the content of a specified region is stored once in a buffer before being transferred to the clipboard, and the region is latticed based on ruled-line data. Then, a function is accessed similar to the function for converting the tagged text data to the CSV format in the case of the above-described OCR. Finally, the text to be sent to the clipboard is converted to a text data format in which the end of the row is a new line symbol and the end of the column is a comma (or tab character).

BRIEF DESCRIPTION OF THE DRAWINGS

An embodiment of the present invention will be described in reference to the drawings.

DESCRIPTION OF THE PREFERRED EMBODIMENT

A. Hardware Construction

Figure 1:
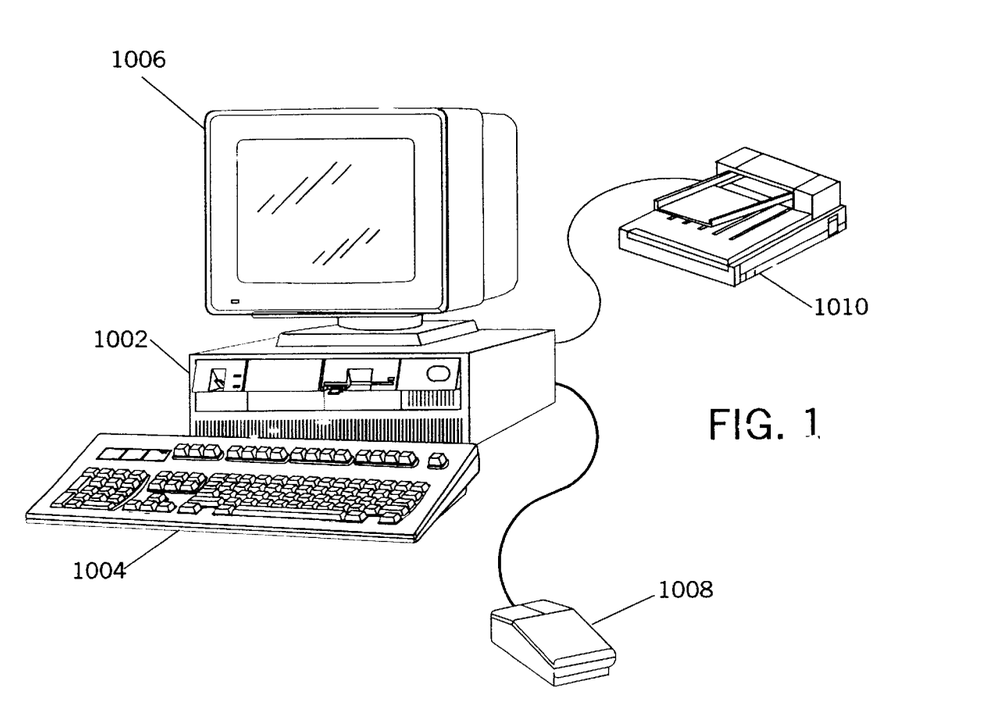
FIG. 1 is a diagram showing the hardware construction by which the present invention is put into practice.

Referring to FIG. 1, there is shown a system configuration for putting the present invention into practice. This configuration is well known and comprises a system apparatus 1002 including main memory (RAM), a CPU, a controller and a hard disk unit, a keyboard 1004 for keying commands or character strings to the system apparatus 1002, a display unit 1006 capable of displaying characters and graphs in a color bit map, and a mouse 1008 for pointing to an arbitrary location on the screen of the display unit 1006 and transmitting positioning information to the CPU. Further, the system apparatus 1002 is connected through a predetermined interface card with the image scanner 1010 of an optical character reader (OCR).

The hard disk unit has stored therein an operating system and application programs such as a spreadsheet program, a wordprocessor, a database, and a text editor.

A program that supports a GUI multi-window environment and has a function of cutting and pasting data through a clipboard or dynamic data exchange (DDE) between applications on different windows, such as Windows (a trademark of Microsoft), OS/2 (a trademark of IBM), and X-WINDOW system (a trademark of MIT) on AIX (a trademark of IBM), can be adopted for the operating system.

B. System Configuration

The system configuration of the present invention will hereinafter be described in greater detail in reference to FIG. 2.

First, an image input unit 2002 is connected to an optical character reader (OCR) 2001, and an image read by the scanner 1010 is displayed through the OCR 2001, the image input unit 2002, and an output control unit 2012 on one window of the display unit 1006.

A text input unit 2004 acquires text display data from a processing unit 2010 and transfers it to an output control unit 2012 so that the content can be displayed on one window of the screen of the display unit 1006.

An input unit 2006 is a processing unit for detecting an event such as clicking, dragging, and double-clicking of a mouse, the movement of a cursor or a keyboard, and the pushing of a new line key, and this detection signal is actually determined in an input determination unit 2007.

The input determination unit 2007 detects the current location of the cursor and a specified range that is based on the location of the cursor. The specified range is normally rectangular and, for example, a rectangular region appears on the screen by dragging the mouse from a certain location of the cursor with the button of the mouse pressed down and will be enlarged if the mouse button is further moved with the button pressed down. The specification of the range will be completed when the mouse button is released as the rectangular region is enlarged to cover a predetermined region.

The processing unit 2008 connected to the OCR 2001 stores tagged text data analyzed by the OCR 2001 and, particularly, the portion of the tagged text data that has been interpreted to be indicative of a table is utilized by the present invention.

The processing unit 2010 includes a buffer memory for storing text data for a wordprocessor or a text editor that performs the processing of the present invention, and a portion of this content is displayed through the text input unit 2004 and the output control unit 2012 in one window of the screen.

A table data acquisition unit 2014 accesses the tagged text data stored in the processing unit 2008, based on a range that is specified by the input determination unit 2007, and acquires a portion relevant to a table from the tagged text data.

A ruled line and character data acquisition unit 2016 accesses the processing unit 2010 for storing the internal data for a wordprocessor or a text editor and acquires the ruled lines and character data in a region that is specified by the input determination unit 2007.

A table analysis unit 2018 detects a character that is to be stored in an individual divided region obtained by dividing a specified range into the form of a lattice. Note that the processing in the table analysis unit 2018 will be described later.

A spreadsheet data conversion unit 2020 receives data from the table data acquisition unit 2014 or table analysis unit 2018 and converts the data to a spreadsheet format which is data cut by CSVs or tab characters and which is capable of storing data in an individual cell, while maintaining a table format, with respect to a typical spreadsheet program such as Excel (a trademark of Microsoft) and Lotus 1-2-3 (a trademark of Lotus Development) for Windows.

The spreadsheet data converted in this way is transferred through an external storage transfer unit 2022 to the clipboard or transferred directly to the spreadsheet program by dynamic data exchange (DDE). Alternatively, the data for an object in a table embedded in the spreadsheet program is changed by object link embedding (OLE).

C. Processing of the Invention

The processing of the present invention will hereinafter be described in reference to the diagram of an explanation of the operation in FIG. 3 and the flowcharts in FIGS. 4 and 5.

Since the processing in the case of the viewer of the data of the OCR and the processing in the case of the wordprocessor or text editor are slightly different, they will be described individually.

C-1. Viewer of OCR Data

Figure 3A:
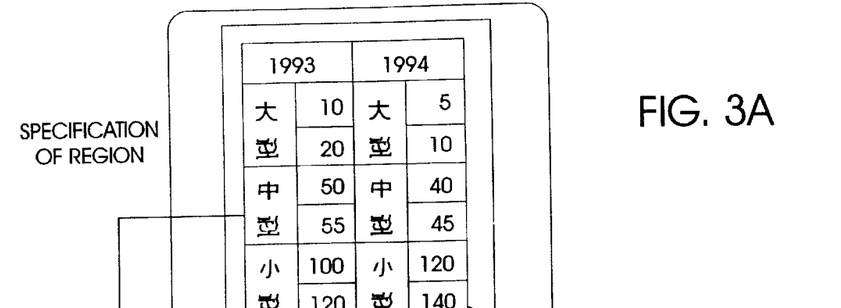
FIG. 3 is a diagram showing how a table is cut and pasted from the viewer of an OCR to a spreadsheet.
Figure 3B:
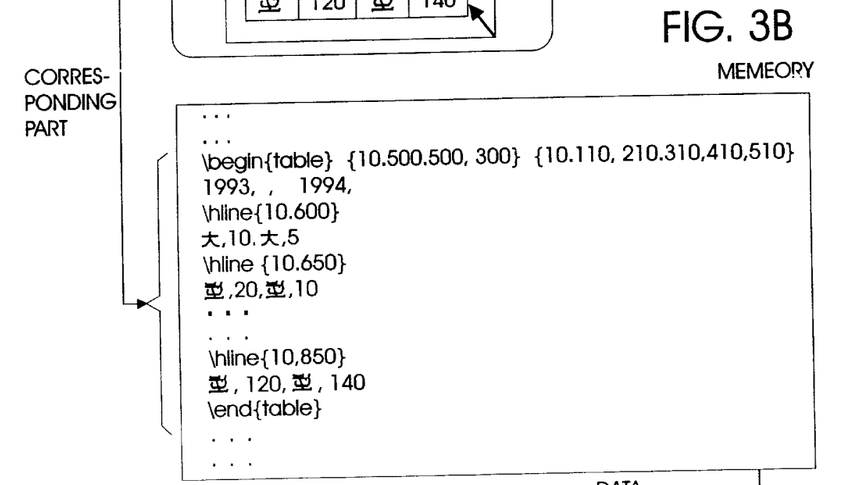
Figure 3C:
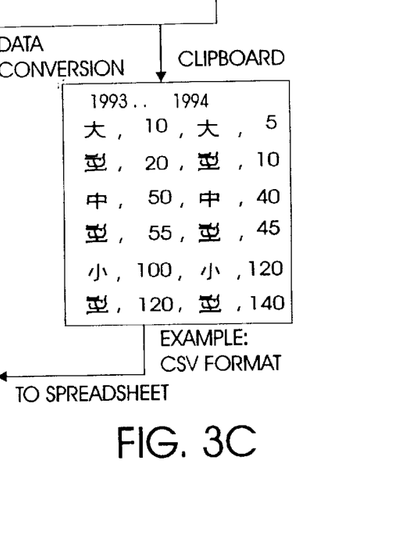
Figure 3D:
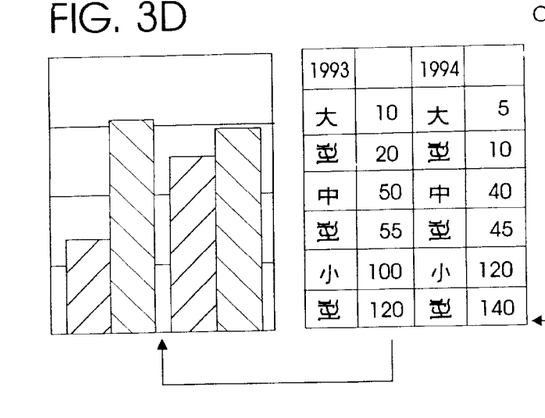
Figure 4:
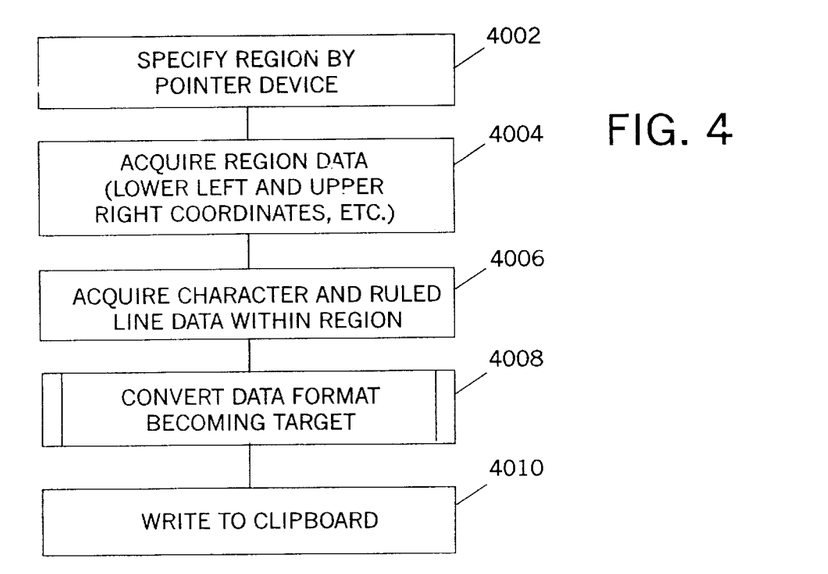
FIG. 4 is a flowchart showing the processing of the present invention.

If, in the viewer for OCR data according to the present invention, there is selected a "table copy" in a pull-down menu accessed by clicking, for example, a "document" on a title bar (see the window 6010 in FIG. 6), the processing of the flowchart in FIG. 4 will be started. In step 4002 in FIG. 4, a rectangular range is specified as shown in FIG. 3(*a*) by means of a pointer device such as a mouse 1008. In FIG. 2, this is performed by the input unit 2006. The method of specifying a rectangular region is various types of methods such as the above-described method by dragging and a method in which the "range specification" is selected from a menu bar in a pull-down menu, and a rectangular range is enlarged by moving the mouse simply or keeping the cursor key pushed down and specified by clicking the mouse or pushing the new line key. The present invention is not limited to a specific range specification among these methods, and an arbitrary range specification method may be adopted.

Figure 2:
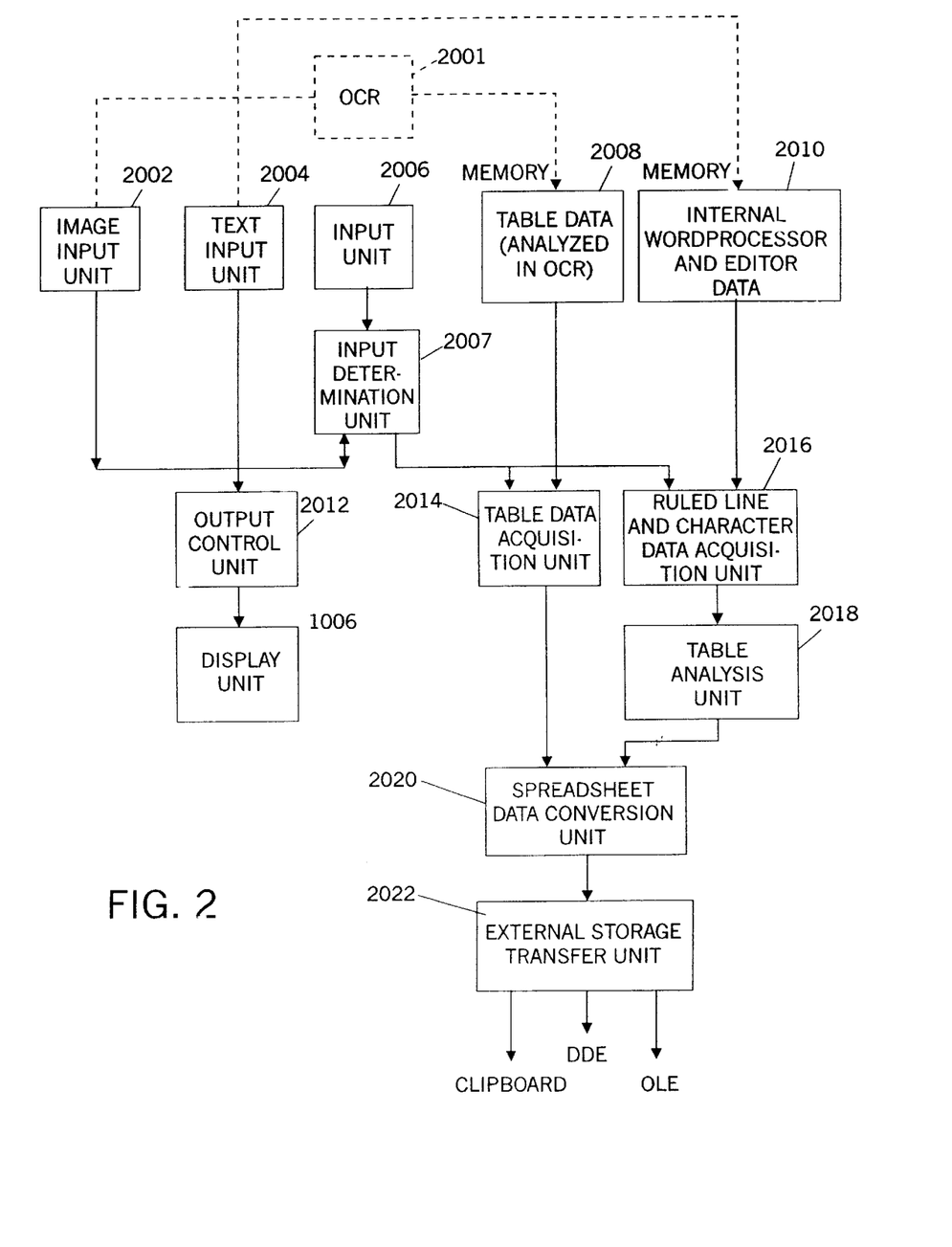
FIG. 2 is a block diagram showing a processing unit of the present invention.

If a range is specified in this way, in step 4004 the coordinates of the four corners of the specified rectangular range will be determined by the input determination unit 2007 of FIG. 2.

Next, in step 4006 the data 2008 analyzed by the OCR is accessed in accordance with the coordinates of the four corners of the specified rectangular range by the data acquisition unit 2014. Therefore, the text data beginning at "\begin{table}" and ending at "\end{table}" such as that shown in FIG. 3(*b*), which is data analyzed by the OCR, is acquired by the table data acquisition unit 2014. Because a method for generating tagged text data such as that shown in FIG. 3(*a*) by an OCR is not the subject matter of the present invention and is disclosed in a publication such as PUPA 4-278634, a description of the method will be omitted here.

Note that, in FIG. 3(*b*), what corresponds to the ruled data is data such as {10,500,500,300} in the column of the "\begin{table}" which is indicative of a vertical line, and data such as "\hline{10,600}" indicative of a horizontal line.

In step 4008, data such as that shown in FIG. 3(*b*), which was supplied by the data acquisition unit 2014, is converted to CSV data format, for example, as shown in FIG. 3(*c*), by the spreadsheet data conversion unit 2020. Therefore, the processing necessary is to remove a tag simply in the most simple case. However, in the case of a specific spreadsheet program, there are some cases in which text data cut not by a comma but by a tab character is required to have table data pasted. In addition, a character string is required to be enclosed in quotation marks ("), and, if it is based upon a SYLK format used in Multiplan (a trademark of Microsoft), there are very many variations. It is therefore desirable that a plurality of table data formats be provided in the menu of the OCR data viewer of the present invention and one of them can then be selected optionally.

The corresponding relationship between the CSV format and the SYLK format is as follows: That is, data expressed as shown in Table 1 in the CSV format using a comma is expressed.

Table 1

"TOKYO", 1, 110.21

"OSAKA", 2, 89.05

As shown by Equation 1 in the SYLK format:

Equation 1

B;Y2;X3

C;Y1;X1;K"TOKYO"

C;X2;K1
C;X3;K110.21
C;Y2;X1;K"OSAKA"
C;X2;K2
C;X3;K89.05
E

In Equation 1, B;Y2;X3 indicates that the size of the y direction of table data is 2 and the size of the x direction is 3. Also, in the row beginning at "C;," a format such as Yn;Xm;Ka indicates that data for "a" is stored in the cell of n row, m column. Further, a column from which an expression of "Yn" is omitted indicates that it is the same column position as the column just above.

In step 4010, the data shown in FIG. 3(*c*) is written to the clipboard by the external storage transfer unit 2022. Then, the window in which the spreadsheet application is being accessed is made active, the position of the cursor is disposed in the desired cell by clicking the mouse, and next, if "Edit" is pulled down from the menu bar of the spreadsheet application and "Paste" is selected, the table data written in step 4010 will be pasted so that the position of the current cell is held in the top left corner. Since the table pasted onto the spreadsheet in this way holds its original table data format, it is possible to draw a bar graph based on cells having figures arranged therein, as shown in FIG. 3(*d*), or to specify a plurality range for cells including figures and to calculate a mean value or a standard deviation.

Figure 6:
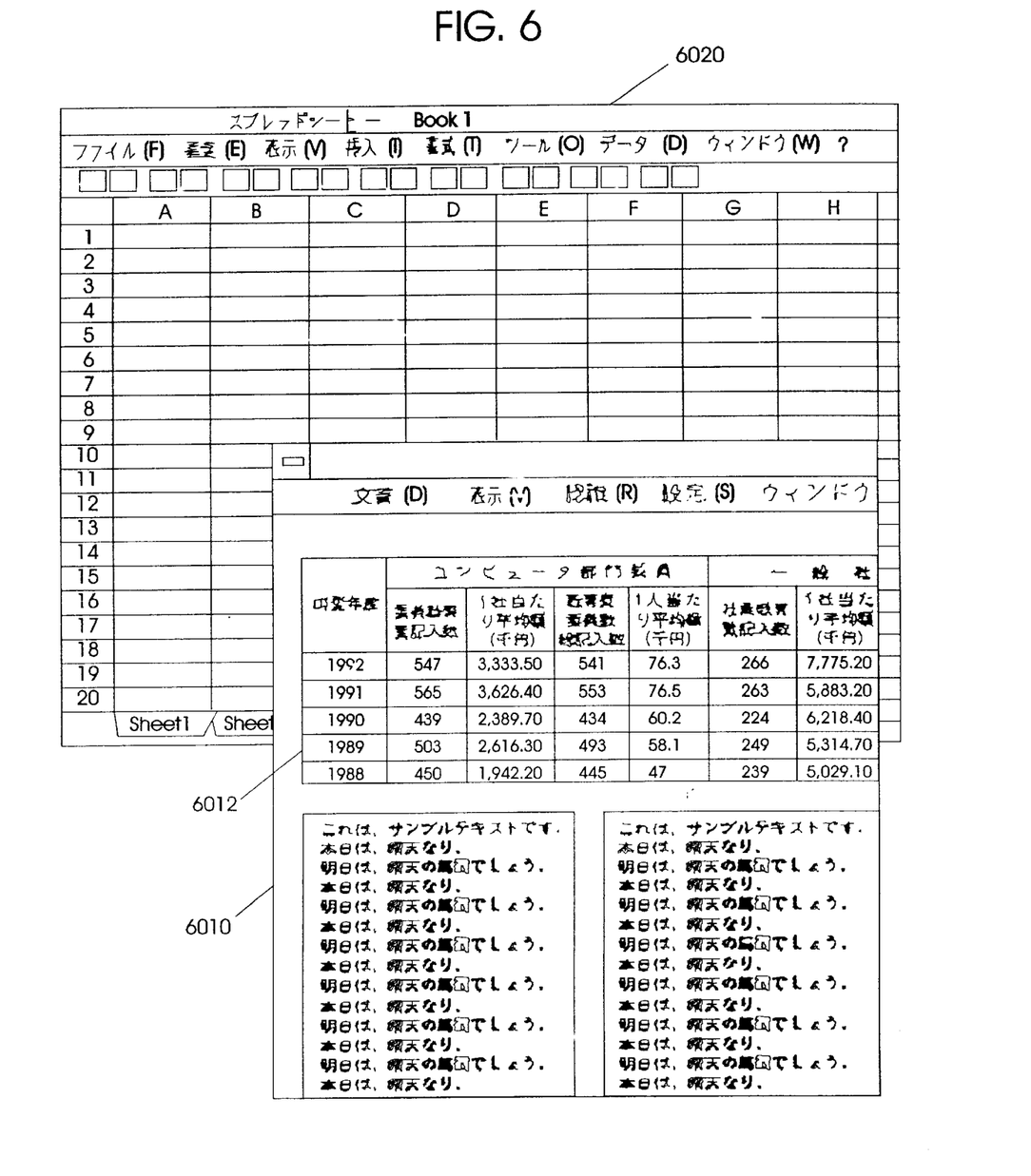
FIG. 6 is a diagram showing an example of the screens of the viewer of the OCR and the spreadsheet program before the cutting and pasting of a table.
Figure 7:
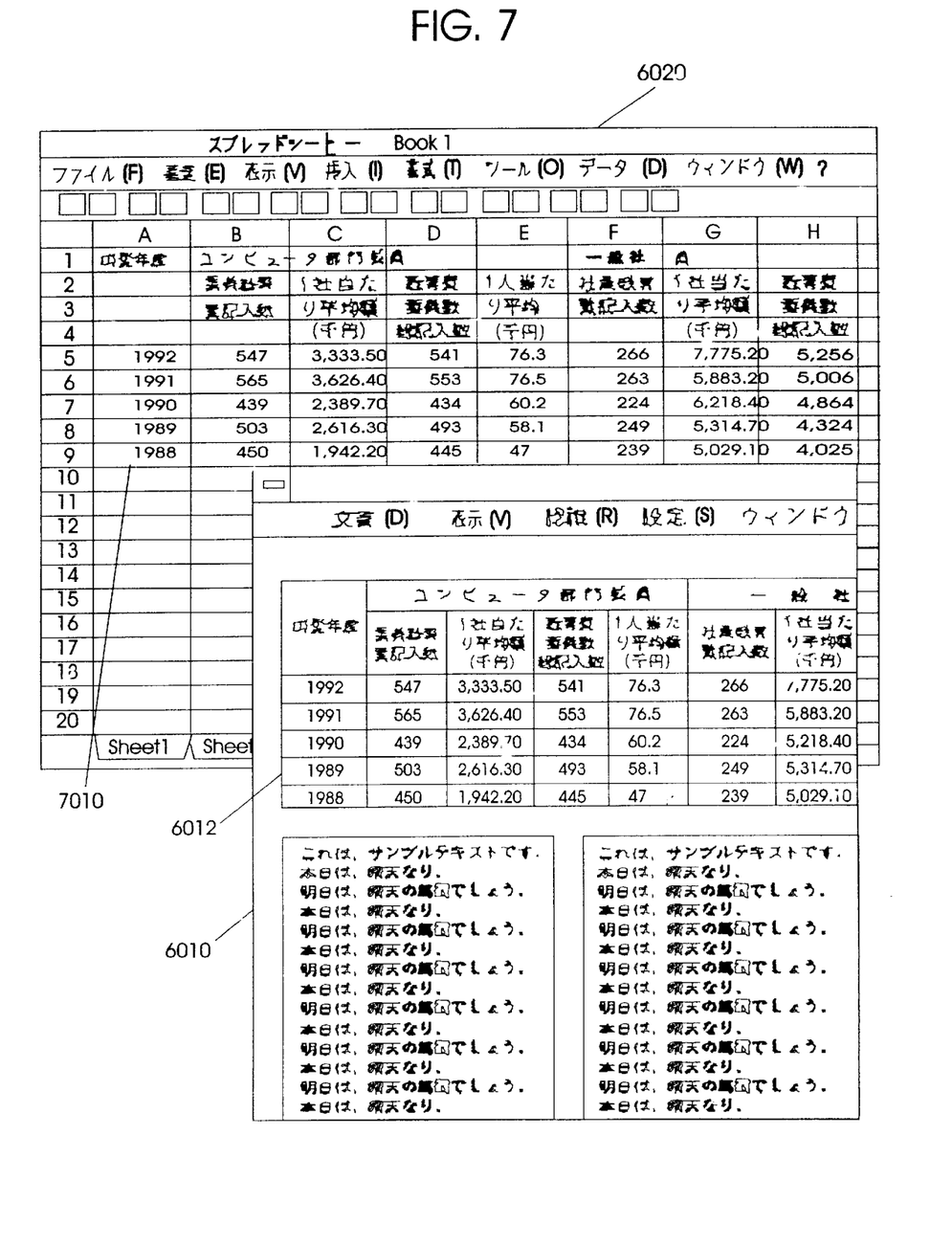
FIG. 7 is a diagram showing an example of the screens of the viewer of the OCR and the spreadsheet program after the cutting and pasting of a table.

This example will be described more concretely in reference to the screens shown in FIGS. 6 and 7. In FIG. 6, the viewer of the result of recognition of the OCR is displayed in the window 6010, and the spreadsheet program is displayed in the window 6020. Note that the viewer is provided with a clipboard transfer function that follows the present invention.

Then, for example if the table 6012 of the viewer is specified by the mouse, a pull-down menu (not shown) is displayed by clicking on "Document" of the title bar of the table 6012 and then "Table Copy" (not shown) is selected, what is stored in the clipboard will be, according to the present invention, not a bit map image of the region specified on the viewer nor a tagged text of the result of recognition of a position of a table held on a main storage or hard disk in connection with the display content of the viewer of the table, but the text data in the CSV format having, for example, the structure of the table 6012 reflected thereon.

Next, if the window 6020 is selected as an active window, a current cell is made A1 by clicking the mouse, "Edit" on the menu bar is clicked to pull down the "Edit" menu, and then "Paste" is selected, the A1 cell will be held at the top left corner and a table 7010 will be pasted onto a spreadsheet 7002, while reflecting the structure of the table 6012.

C-2. Wordprocessor or Text Editor

If, in the wordprocessor or text editor having the table copy function of the present invention, "Table Copy" in a pull-down menu being accessed by clicking, for example, "Edit" (not shown) on the title bar is selected, the operation 4002 in the flowchart in FIG. 4 will be started. In this case, the operation of "Range Specification" by the mouse or the cursor of the keyboard is identical to the case for the viewer of the OCR.

Next, in step 4004, the internal data 2010 of the wordprocessor or text editor is accessed according to the coordinates of the four corners of a specified rectangular region by means of the table data acquisition unit 2014, and thereby the text data in the specified range is acquired in step 4006 by means of the ruled line and character data acquisition unit 2016. As will be understood from the expression "ruled line," the ruled line and character data acquisition unit 2016 acquires ruled-line data as well as character data, and the ruled-line data is used for determining the structure of the table in a specified range. That is, in the case of the wordprocessor or text editor according to the present invention, step 4008 consists of a plurality of steps 5002–5010 such as those shown in FIG. 5, unlike the above-described case of the OCR data viewer.

Figure 5:
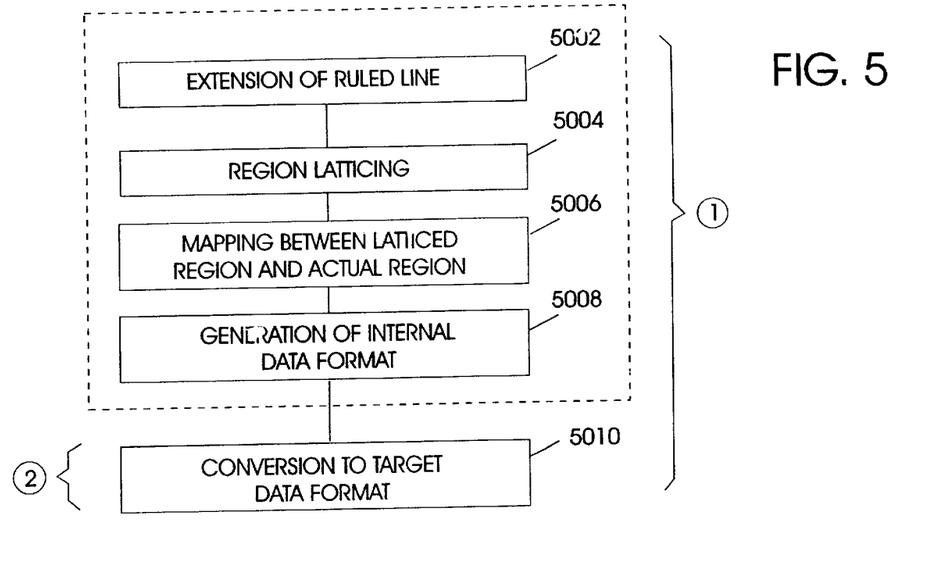
FIG. 5 is a flowchart showing a process of analyzing the table of a word processor or text editor according to ruled line data.
Figure 8:
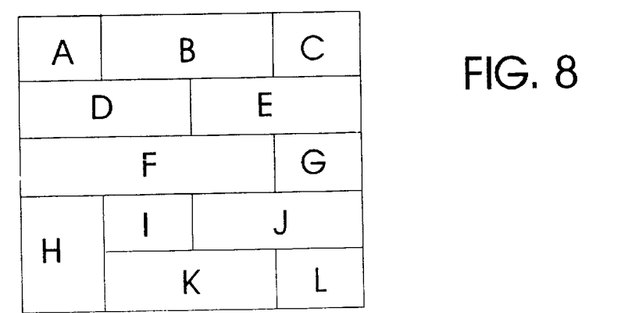
FIG. 8 is a diagram showing an example of a table including ruled lines in a word processor or text editor.

More particularly, referring to FIG. 5, in step 5002 an operation of extending a ruled line is performed. The reason that this is needed is that, in the case of the wordprocessor or text editor, the lengths of the blocks in each column (or row) are not always even, as shown in FIG. 8. (In fact, for a table to be recognized by an OCR, the lengths of the blocks in each column are not always even. However, since the recognition and interpretation of such a table is performed in advance by the OCR and reflected in tagged text such as that shown in FIG. 3(*b*), which is generated as a result, the table data acquisition unit 2014 need not interpret the table in view of ruled-line data again.) Since, in the case of the wordprocessor, the ruled-line data is embedded in a document by means of a special symbol or stated in a separate attribute file associated with a document, the special symbol or attribute file is interpreted. Since the text editor is not provided with a special ruled-line function, and a character for a ruled-line, such as "┬," "┤," or "└," is normally embedded as a text, the position of such a ruled-line character is interpreted.

Figure 9:
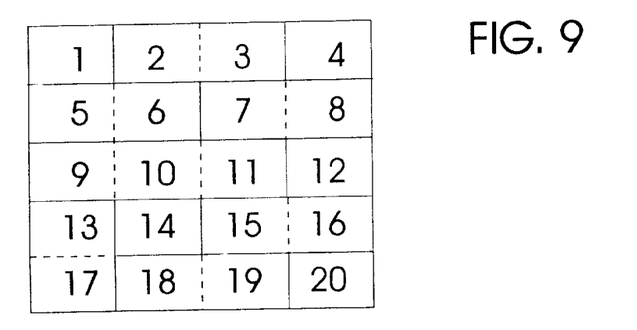
FIG. 9 is a diagram showing an imaginary lattice region based on ruled lines.

If the existence of ruled lines is detected in this way and they are extended in step 5002, in step 5004 a region will be latticed as shown in FIG. 9. In FIG. 9, the solid line is an actual ruled line and the broken line is an imaginary ruled line. Also, FIGS. 1–20 in FIG. 9 are not the actual data of a table but serial numbers given to regions corresponding to the imaginary lattice cells of the table.

Figure 10:
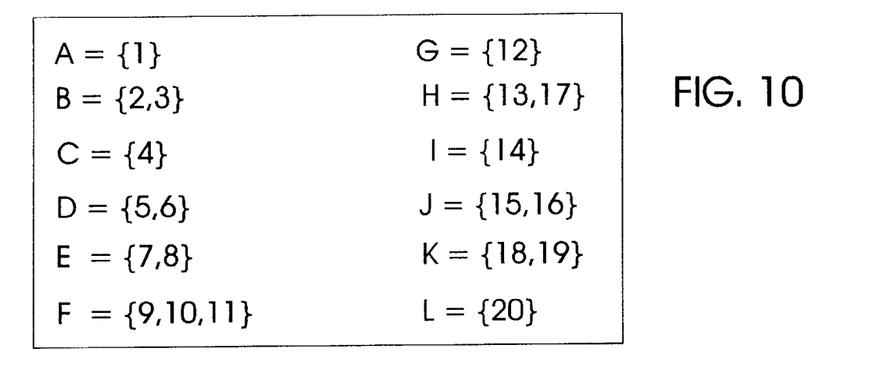
FIG. 10 is a diagram showing a corresponding relationship between actual data and a lattice cell in a table.

In step 5006, mapping of the actual text data of the table onto the imaginary lattice region of the table is performed. The result is shown in FIG. 10. It is to be noted that, particularly in FIG. 10, the character F or H occupies a plurality of lattice cells. When the mapping is obtained in this way, the following processing will be performed on each of the lattice cells in the order of number. That is, when, for example as F={19, 10, 11}, some character occupies a plurality of lattice cells, it is stored in the lattice cell of the lowest number and subsequent cells are made blank.

Figure 12:
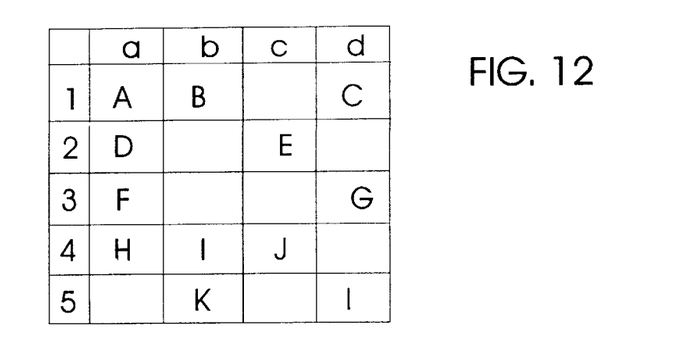
FIG. 12 is a diagram showing the state in which the table has been pasted onto the spreadsheet program.

When such a correlation is performed, the lattice cells will be occupied by characters, as shown in FIG. 12. The occupancy of the cell such as this is obtained in step 5008. If data in a format such as that shown in FIG. 12 have been generated in this way, in step 5010 there can be very easily generated data in an arbitrary format that the spreadsheet assumes.

Figure 11:
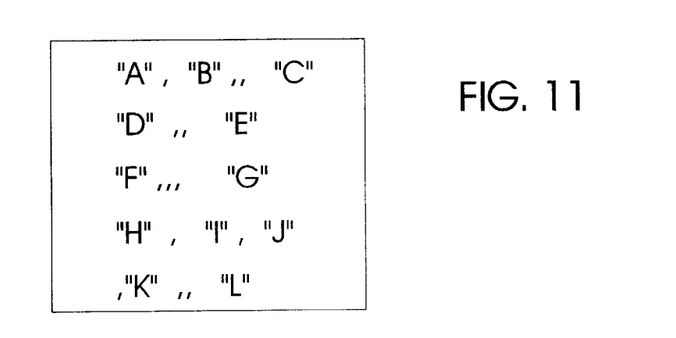
FIG. 11 is a diagram showing conversion data in a CSV format in a table.

If, for example, the lattice cell having actual data stored therein is converted to a character in which actual data is enclosed by quotation marks ("), the boundary between the sides of adjacent lattice cells is expressed by a comma, and the end of a column is expressed by a new line code, text data in the CSV format such as that shown in FIG. 11 will be obtained. Depending on the spreadsheet program in which pasting is performed, there are many variations, such as a method in which a comma is expressed with a tab character and a method in which enclosing with " is omitted, as described above.

It can also be conceived that FIG. 12 also shows the state in which, when the table in the wordprocessor or text editor as shown in FIG. 8 is actually pasted onto a spreadsheet program, that table appears in the spreadsheet program.

Note that, in FIG. 2, above-described steps 5002–5010 are processing that is executed by the table analysis unit 2018.

When step 5010 ends, the processing of the present invention in the case of the wordprocessor or text editor will return to step 4010 in FIG. 4, but the description of the subsequent processing will be omitted because it is identical with the above-described case of the viewer of the OCR.

Note that, since above-described steps 5002–5010 make use of ruled line data, it seems necessary in the case of the wordprocessor or text editor that the processing of the present invention have ruled line data, but it is possible to reflect the table data without the ruled-line data. Then, for a case in which a ruled line is not always in a table region cut from the wordprocessor or text editor, i.e., a case independent of a ruled line, a processing method will be described in reference to FIGS. 13–20.

C-21. Another Embodiment of Table Analysis Processing

Figure 13:
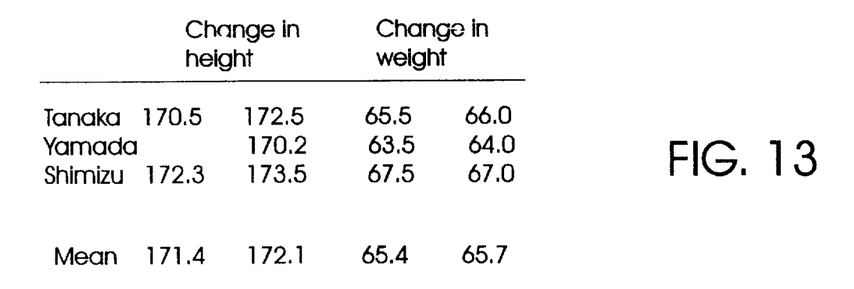
FIG. 13 is a diagram used to explain the analysis method of table-structured data independent of ruled line data.

It is now assumed that a text in a table format such as that shown in FIG. 13 is cut by cut-and-paste processing and is an object to be analyzed. A table analysis program, which follows this embodiment, first obtains a group of blank regions (blank block) in the table in the vertical and horizontal directions. In a case in which a ruled line (including a continuation of minus signs as well as ⊢, ⊤, and ⊣) has already existed, it is regarded as blank.

Figure 14:
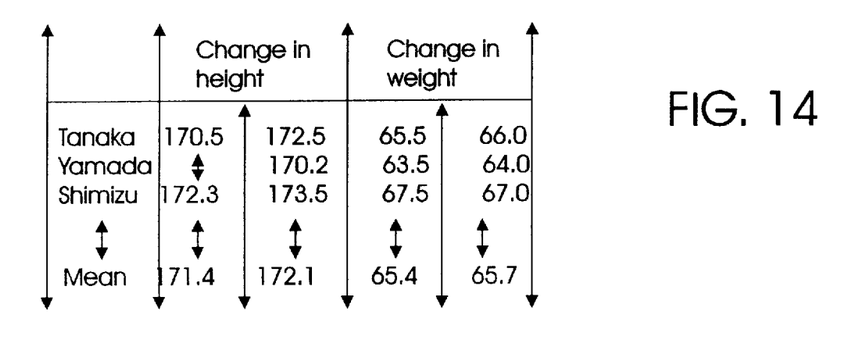
FIG. 14 is a diagram used to explain the analysis method of table-structured data independent of ruled line data.
Figure 15:
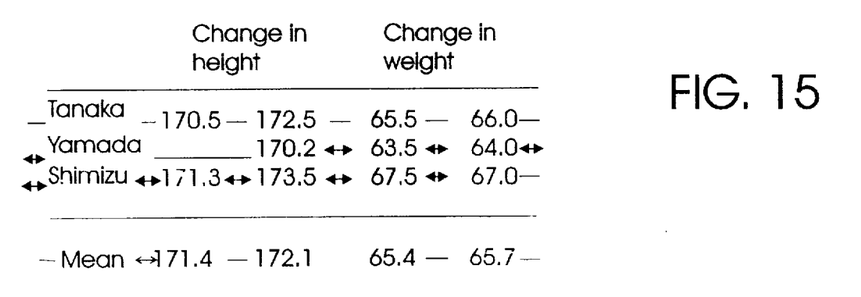
FIG. 15 is a diagram used to explain the analysis method of table-structured data independent of ruled line data.

The blank block in the vertical direction is shown in FIG. 14, and the blank block in the horizontal direction is shown in FIG. 15. In FIGS. 14 and 15, the blank blocks are indicated by arrows (← →) in the vertical and horizontal directions.

Imaginary ruled lines are then drawn in the table of a specified range in accordance with the following rules.

(1) When the opposite ends of the vertical blank block contact the outer peripheries or already drawn ruled lines, an imaginary ruled line is drawn at the position of the vertical blank block.

(2) When the opposite ends of the horizontal blank block contact the outer peripheries or already drawn ruled lines, an imaginary ruled line is drawn at the position of the horizontal blank block.

A process of drawing an imaginary ruled line by applying above-described rules (1) and (2) will hereinafter be described for the region in FIG. 13.

Figure 16:
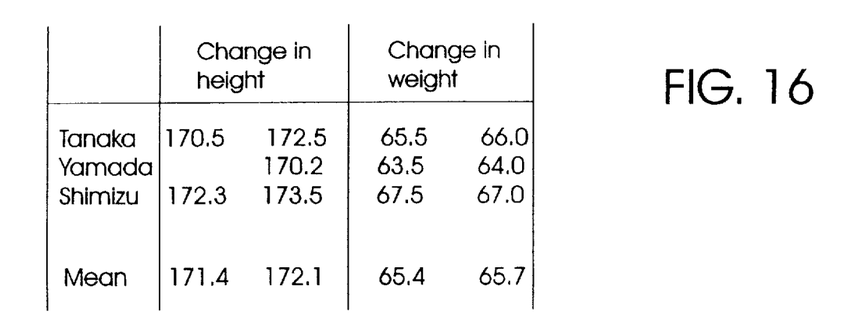
FIG. 16 is a diagram used to explain the analysis method of table-structured data independent of ruled line data.

The first process, as shown in FIG. 16, is to draw an imaginary vertical ruled line whose opposite ends reach the outer peripheries, according to rule (1).

Figure 17:
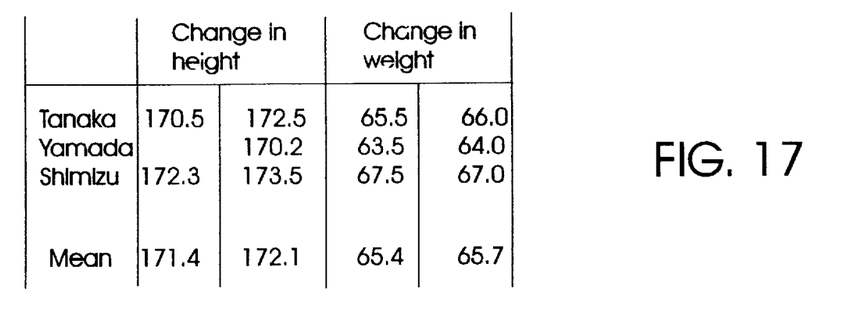
FIG. 17 is a diagram used to explain the analysis method of table-structured data independent of ruled line data.

The next process, as shown in FIG. 17, is to draw an imaginary vertical ruled line whose one end reaches the outer periphery and whose another end reaches an actual ruled line, according to rule (1).

Figure 18:
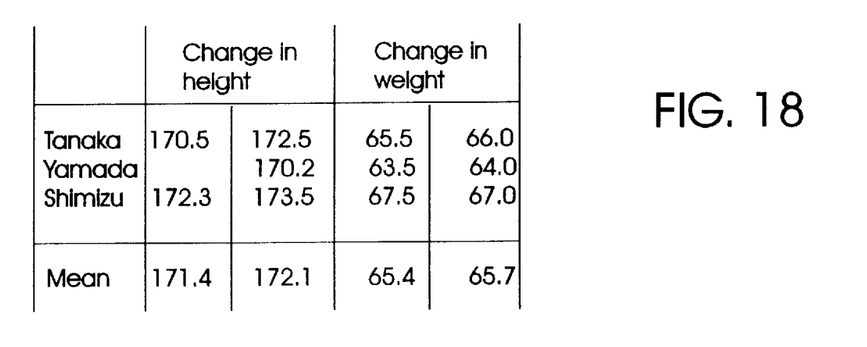
FIG. 18 is a diagram used to explain the analysis method of table-structured data independent of ruled line data.

Next, a horizontal ruled line whose opposite end reaches the outer peripheries is drawn according to rule (2), as shown in FIG. 18.

Figure 19:
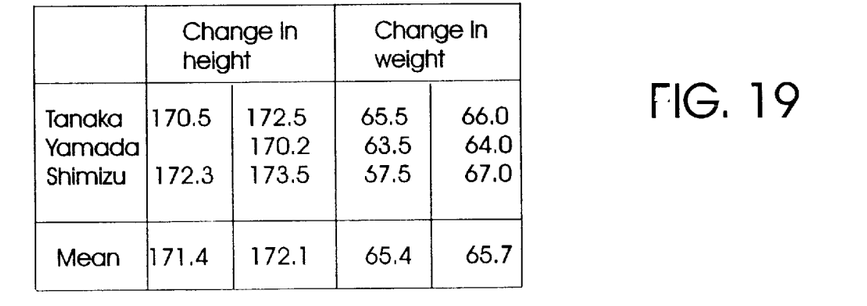
FIG. 19 is a diagram used to explain the analysis method of table-structured data independent of ruled line data.

The vertical and horizontal rules lines are drawn in this way and the result is shown in FIG. 19. Note that FIG. 19 does not show a boundary line between columns such as the column of "Tanaka" and the column of "Yamada," but it is supposed that, in fact, in the spreadsheet the "Tanaka" and "Yamada" are stored in different cells whose boundaries contact in the vertical direction. Therefore, an imaginary horizontal ruled line has been drawn between adjacent columns of all the columns. If an imaginary horizontal ruled line between columns, which is not displayed in FIG. 19, is expressed by a single line, and an actual ruled line given in advance in FIG. 13 and an imaginary horizontal ruled line drawn at the blank column in FIG. 18 are expressed by a double line, there is obtained a table structure such as that shown in FIG. 20. From this structure, a text in the CSV format such as that shown in FIG. 11 can be obtained by the method that has been described in connection with FIGS. 8–12.

Figure 20:
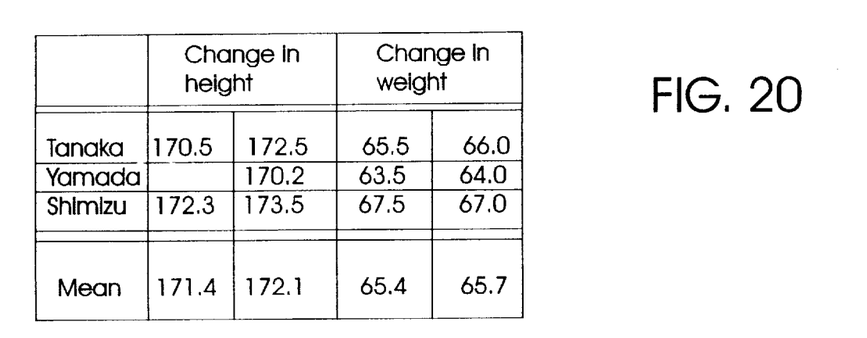
FIG. 20 is a diagram used to explain the analysis method of table-structured data independent of ruled line data.

When the method shown in FIGS. 8–12 is applied, a ruled line of a single line and a ruled line of a double line in FIG. 20 are considered to be the same but, in some cases, an analysis may be made so that the single line gives a mere boundary of a cell and the double line gives a column comprising a blank cell. Alternatively, data of a table structure including attribute data can also be pasted onto a spreadsheet so that the position of the double line becomes a ruled line in the spreadsheet.

It is desirable in the present invention that, preferably, different kinds of table analysis methods be provided according to the table format of a wordprocessor or text editor and a suitable table analysis method can be selected from a menu. If so, there is an increased possibility that a table with a structure can be pasted onto a spreadsheet, by selecting a suitable table analysis method from a menu in accordance with the feature of a table such as a table including ruled lines, a table in which figures or characters are arranged simply in the form of a matrix, and a table already cut on a table by tab characters.

While, in the above embodiment, the wordprocessor and the spreadsheet program have been accessed in separate windows, some wordprocessors of the latest model can set a table having a spreadsheet function at an arbitrary position. It is to be noted that the present invention is applicable to the cutting and pasting of table-structure data from the text portion of an application program within the same window such as this to the spreadsheet portion.

In addition, recently, in some database programs other than spreadsheet programs or wordprocessors, records can be displayed in table format and also data in a format such as the CSV format can be pasted through a clipboard or by DDE.

Therefore, in accordance with the present invention, a target application program to which table-structure data is to be pasted is not limited to a spreadsheet program, but it can be understood that it may be an arbitrary application program which can display data in table format and paste data in a specific format having a table structure.

Further, while, in the above embodiment, a viewer of an OCR, a wordprocessor, and a text editor have been supposed as an application program of a source side acquiring table-structure data, it is to be noted that the present invention is, of course, not limited to these application programs but is applicable to an arbitrary application program which can access main or secondary storage based on a display location on the screen to acquire text data correlated with the displayed content. At this time, the display screen of a source-side application program may be a graphic display screen capable of displaying bit map data, image data, vector line drawing data, and so on, and it may also be a display screen which can display text characters only, such as a text editor. To make a long story short, it is essential that the source-side application program be able to store text data in connection with the text character portion of a screen and access a corresponding portion of the text data based on the position data of character data in a specified range. Note that, when data in the table format which follows the present invention is converted, data such as ruled line data is referred to, if necessary. Therefore, in general, data such as bit map data, which is not correlated with the text data in a specified range, is not transferred to a table data conversion unit, e.g., the spreadsheet conversion unit 2020 shown in FIG. 2.

As has been described hereinbefore, it becomes possible according to the present invention that, without adding additional labor for users, the display data in the table format of a wordprocessor, a text editor, and an OCR viewer is pasted directly onto a spreadsheet program by cut-and-paste operations, while its structure as a table is maintained.

What is claimed is:

1. A method, performed in a data processing system, for mapping non-uniform table-structure input data to a uniform cellular data structure, said non-uniform table-structure input data delineated into different sized data blocks by ruled lines and including columns and rows of data blocks in which both the height and the width of the data blocks in the columns and rows is uneven, said method comprising the computer implemented steps of:

dividing larger input data blocks of said non-uniform table-structure input data into smaller uniformly sized resulting data blocks in uniform rows and columns in a uniform cellular data structure;

consecutively numbering all of the uniformly sized resulting data blocks in a uniform direction within each row and then within adjacent rows;

mapping the input data blocks onto the numbered uniformly sized resulting data blocks;

for each separate input data block, mapping data content of each said separate input data block to that lowest numbered uniformly sized resulting data block of said uniform cellular data structure that is mapped to each said separate input data block.

2. A data processing system, for mapping non-uniform table-structure input data to a uniform cellular data structure, said non-uniform table-structure input data delineated into different sized data blocks by ruled lines and including columns and rows of data blocks in which both the height and the width of the data blocks in the columns and rows is uneven, said data processing system comprising:

means for dividing larger input data blocks of said non-uniform table-structure input data into smaller uniformly sized resulting data blocks in uniform rows and columns in a uniform cellular data structure;

means for consecutively numbering all of the uniformly sized resulting data blocks in a uniform direction within each row and then within adjacent rows;

means for mapping the input data blocks onto the numbered uniformly sized resulting data blocks;

means for each separate input data block for mapping data content of each said separate input data block to that lowest numbered uniformly sized resulting data block of said uniform cellular data structure that is mapped to each said separate input data block.

3. A computer program product, for use in a data processing system, the computer program product comprising:

a computer usable medium having computer readable program code embodied in said medium for mapping non-uniform table-structure input data to a uniform cellular data structure, said non-uniform table-structure input data delineated into different sized data blocks by ruled lines and including columns and rows of data blocks in which both the height and the width of the data blocks in the columns and rows is uneven, said computer program product including:

computer readable program code means for dividing larger input data blocks of said non-uniform table-structure input data into smaller uniformly sized resulting data blocks in uniform rows and columns in a uniform cellular data structure;

computer readable program code means for consecutively numbering all of the uniformly sized resulting data blocks in a uniform direction within each row and then within adjacent rows;

computer readable program code means for mapping the input data blocks onto the numbered uniformly sized resulting data blocks;

computer readable program code means for mapping data content of each separate input data block to that lowest numbered uniformly sized resulting data block of said uniform cellular data structure that is mapped to each said separate input data block.

* * * * *